W. M. PEABODY.
PNEUMATIC TIRE.
APPLICATION FILED FEB. 23, 1915.
1,201,340.
Patented Oct. 17, 1916.
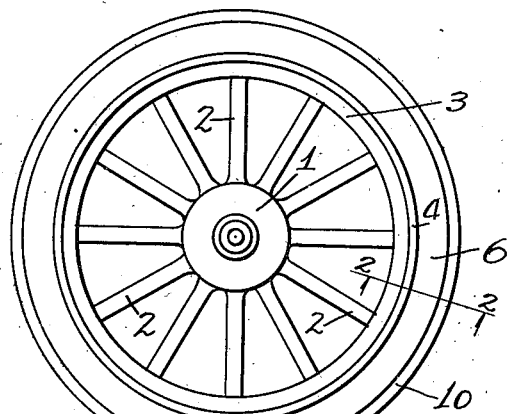
Fig. 1.
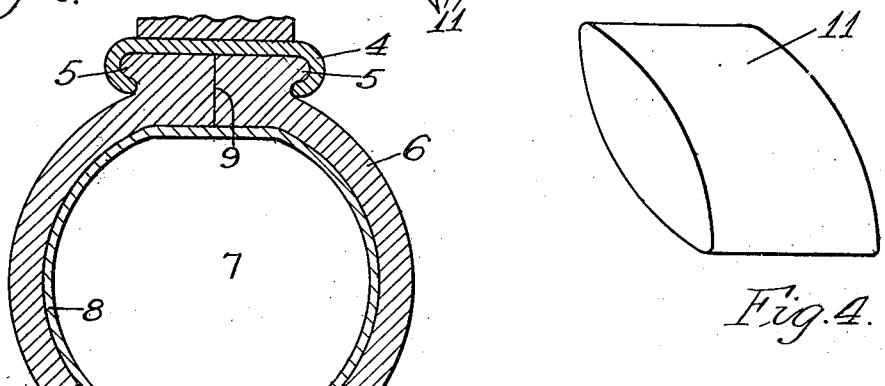
Fig. 2.
Fig. 4.
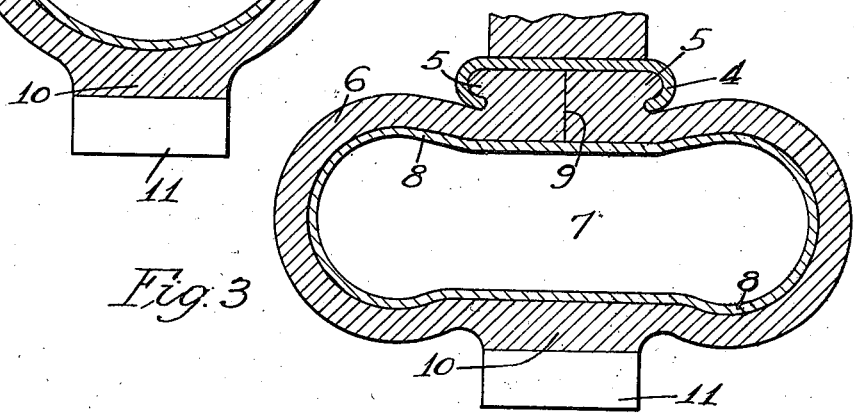
Fig. 3.
Witnesses:
Inventor:
Warren M. Peabody.
by Parker Carter
his Attys.

UNITED STATES PATENT OFFICE.

WARREN MAXWELL PEABODY, OF CHICAGO, ILLINOIS.

PNEUMATIC TIRE.

1,201,340.  Specification of Letters Patent.   Patented Oct. 17, 1916.

Application filed February 23, 1915. Serial No. 9,779.

*To all whom it may concern:*

Be it known that I, WARREN M. PEABODY, a citizen of the United States, residing at Chicago, in the county of Cook and State of Illinois, have invented a certain new and useful Improvement in Pneumatic Tires, of which the following is a specification.

My invention relates to improvements in pneumatic tires for motor vehicles and the like and has for one object to provide a tire which shall be substantially puncture proof.

It has for another object to provide a tire which shall not be liable to rim cut and has for a further object to provide a tire in which the danger of stone bruises and blow outs and the like will be reduced to a minimum.

Other objects of my invention will appear from time to time in the specification.

I have illustrated my invention diagrammatically as applied to a wheel, wherein—

Figure 1 is a side elevation of such a wheel showing the tire tread in part section; Fig. 2 is a section along the line 2—2 of Fig. 1 on an enlarged scale; Fig. 3 is a section through the tire on a similar line to Fig. 2 showing the tire flexed or compressed under load, the compression being somewhat exaggerated; and Fig. 4 is a detail perspective of one of the tread members.

Like parts are indicated by like letters throughout the several figures.

The hub 1 carries the spokes 2, felly 3 and ordinary clencher rim 4. Mounted upon the wheel and held in position thereon by the beads 5 engaging the rim is a substantially cylindrical casing 6 having a cylindrical inner chamber 7 containing a cylindrical pneumatic tube 8. This casing is split at 9 to permit insertion and withdrawal of the inner tube in the usual manner. About the periphery of the casing is an annular rib or reinforcing ring 10 integral with the casing. Embedded in this rim are rigid tread members 11 of metal or other suitable material preferably vulcanized or otherwise attached to the rib and arranged edge to edge as indicated in Fig. 1. The width of each of these members together with the annular rib or ring about the periphery of the casing is substantially the same as the width between the inner portion of the clencher hooks or rings on the rim so that a tire is made up of a substantially cylindrical portion having an inner annular connection to the wheel and an outer annular tread connection of the same width as the wheel connection.

It will be evident that while I have shown in my drawings an operative device, still many changes might be made both in size, shape and arrangement of parts without departing from the spirit of my invention and I wish, therefore that my drawings be regarded as in a sense diagrammatic.

The use and operation of my invention are as follows: It is the air held under pressure within the air chamber formed by the inner tube which supports the load and makes for the resilience of the pneumatic tire. In my arrangement this chamber is entirely above the clencher rim and since it is cylindrical it has the largest air capacity possible for its size and there is no waste air space. The rigid tread surface insures that the width covered by the tread will not vary. The rigid attachment to the wheel insures that the width of the area through which the load is applied to the wheel will not vary. The result is that when a load is applied to the wheel and when the tire is compressed the rigid tread is caused to approach the rim of the wheel as shown in Fig. 3 and the two opposed sides of the casing separate or bulge outwardly as indicated, and experience shows that they will bulge outwardly in two symmetrical curves and that the curvature of these walls will be substantially the same all the way along and there will be no concentration of the bending or distorting movement or effect at any particular point. I have shown the distortion of the tire somewhat exaggerated for ordinary service although it will be obvious if the tire is under inflated such a distortion may easily and frequently occur. In case the tire is so under inflated or the load is so great that the annular tread member is forced clear back against the rim even then there will be no rim cutting because when this happens the load will then be applied direct from the bead to the rigid tread rim and since the two are the same width there will be no tendency to bend the wall of the casing other than by the mere displacement of the relative parts and if the pressure is sufficiently great to overcome the air pressure in the inner tube the sole result will be that the tire will act as a cushion tire but under such circumstances it will form two substantially separate air chambers one on either side of the tread formed by the curved wall which will be gradually curved throughout its total length rather than sharply bent at any one point.

The tendency of the air under pressure in the tire is to cause it to assume and maintain a cylindrical position and cylindrical cross section under its normal load. Any increase of this load or any decrease of the normal air pressure causes or permits a distortion such as is shown in Fig. 3 whereby the two rigid or substantially rigid annular areas of the inner and outer periphery of the tire tend to approach. The yielding wall of the casing is no-where in contact with the ground and as these two parts approach toward each other the only thing that the yielding wall can do is to bulge outwardly and this it does but because it is affected only by the pressure in the tire and by the force which tends to bring its two extremities together and because it is not interfered with by friction with the ground it bulges symmetrically and the distortion prevails uniformly throughout its entire width, thus as above indicated there is no concentration of the bending effect at any one point.

I have referred to the annular ring about the outside of the housing as being rigid. It is rigid in a line parallel with the line of the axis of the rotation of the wheel but the ring itself as a ring is of course more or less yielding and flexible but that portion of the tread which is in contact with the ground is practically speaking rigid because of reinforcement or reinforcing members as indicated.

It will be noted that in Fig. 3 when pressure is on the tire the surface immediately above the tread rim becomes substantially flat in cross section and it will also be noted that the surface immediately above the anchor or bead ring or rims likewise becomes substantially flat so that these two surfaces are substantially symmetrical and thus a minimum of bending of the wall takes place.

It will be understood that the two inner beads and stiff or rigid housing portion accompanying them form what is in effect a rigid anchor ring whereby the casing may be attached to the wheel.

I claim:

A resilient tire comprising an integral cylindrical casing, an inner peripheral wheel engaging annular base, an outer annular peripheral tread ring of substantially the same width as the wheel engaging base and projecting outwardly radially from the cylindrical casing, the side walls of this ring being substantially perpendicular to the surface along which the tire is adapted to travel, a series of separate rigid reinforcing members embedded in and firmly attached to the tread face of the tread ring alone, said tread members being an elliptic in cross section, and being free to rotate or rock with respect each one to each of its neighbors.

In testimony whereof, I affix my signature in the presence of two witnesses this 16th day of February 1915.

WARREN MAXWELL PEABODY.

Witnesses:
LAUREL M. DOREMUS,
MINNIE M. LINDENAU.